(12) United States Patent
Wang et al.

(10) Patent No.: US 11,269,127 B2
(45) Date of Patent: Mar. 8, 2022

(54) EQUIPMENT WITH KEYS HAVING TRIM AND ILLUMINATION

(71) Applicant: Apple Inc., Cupertino, CA (US)

(72) Inventors: Paul X. Wang, Cupertino, CA (US); Aidan N. Zimmerman, Sunnyvale, CA (US); Michael Y. Cheung, Cupertino, CA (US); Ming Yu, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/961,016

(22) Filed: Apr. 24, 2018

(65) Prior Publication Data

US 2018/0372939 A1    Dec. 27, 2018

Related U.S. Application Data

(60) Provisional application No. 62/524,011, filed on Jun. 23, 2017.

(51) Int. Cl.
*G06F 1/16* (2006.01)
*G06F 3/02* (2006.01)
(Continued)

(52) U.S. Cl.
CPC .......... *G02B 6/0021* (2013.01); *G02B 6/006* (2013.01); *G06F 1/1641* (2013.01);
(Continued)

(58) Field of Classification Search
CPC ..... G02B 6/0021; G02B 6/006; G06F 1/1641; G06F 1/1662; H01H 13/83;
(Continued)

(56) References Cited

U.S. PATENT DOCUMENTS 7,414,213 B2 * 8/2008 Hwang .................. H01H 13/83
200/314
7,417,624 B2 * 8/2008 Duff ...................... G06F 3/0202
341/22
(Continued)

FOREIGN PATENT DOCUMENTS

CN          103677285 A       3/2014
EP          0366557 A2        5/1990
(Continued)

*Primary Examiner* — Chanh D Nguyen
*Assistant Examiner* — Ngan T. Pham-Lu
(74) *Attorney, Agent, or Firm* — Treyz Law Group, P.C.; G. Victor Treyz; David K. Cole

(57) ABSTRACT

Electrical equipment such as a tablet computer cover, a laptop computer, or other equipment may include keys. Each key may have a key member. Coatings such as opaque coating layers may be formed on the key members. Opaque coating layers may be patterned to form symbol-shaped openings associated with key labels. Opaque coating layers may also have recessed peripheral portions and other features to enhance the appearance of the keys. Metal coating layers such as physical vapor deposition metal layers may be incorporated into the keys. Key members may have outer surfaces and opposing inner surface on which patterned coating layers may be formed. Peripheral edge portions of the key members may extend between the outer and inner surfaces and may be coated with metal coating layers to form reflective metal trim structures. Backlight illumination for the keys may be formed form light sources such as light-emitting diodes.

20 Claims, 12 Drawing Sheets

(51) Int. Cl.
*F21V 8/00* (2006.01)
*H01H 13/83* (2006.01)

(52) U.S. Cl.
CPC ........... *G06F 3/0202* (2013.01); *H01H 13/83* (2013.01); *G02B 6/0041* (2013.01); *G06F 1/1662* (2013.01); *H01H 2215/004* (2013.01); *H01H 2219/028* (2013.01); *H01H 2221/006* (2013.01); *H01H 2221/07* (2013.01); *H01H 2229/012* (2013.01)

(58) Field of Classification Search
CPC ....... H01H 2215/004; H01H 2219/028; H01H 2221/006; H01H 2221/07; H01H 2229/012
USPC .......................................................... 345/170
See application file for complete search history.

(56) References Cited

U.S. PATENT DOCUMENTS

| | | |
|---|---|---|
| 7,489,303 B1 | 2/2009 | Pryor |
| 2008/0034577 A1* | 2/2008 | Yeh ........................ H01H 13/88 29/622 |
| 2009/0173610 A1 | 7/2009 | Bronstein et al. |
| 2009/0201179 A1* | 8/2009 | Shipman ............... G06F 3/0202 341/22 |
| 2010/0156801 A1* | 6/2010 | Yurochko ............. G06F 3/0202 345/170 |
| 2011/0056817 A1* | 3/2011 | Wu ........................ H01H 13/14 200/344 |
| 2011/0182643 A1* | 7/2011 | Hu ........................ G06F 3/0219 400/490 |
| 2012/0092263 A1* | 4/2012 | Peterson ................ G06F 3/0202 345/168 |
| 2012/0099264 A1 | 4/2012 | Degner et al. |
| 2012/0154289 A1* | 6/2012 | Mahowald ............ G06F 3/0202 345/169 |
| 2013/0233686 A1* | 9/2013 | Zhou .................. H01H 13/7057 200/5 A |
| 2013/0328785 A1 | 12/2013 | Brooks et al. |
| 2014/0069791 A1* | 3/2014 | Chu ..................... H01H 13/704 200/5 A |
| 2015/0090571 A1* | 4/2015 | Leong .................... H01H 13/83 200/5 A |
| 2015/0370339 A1 | 12/2015 | Ligtenberg et al. |
| 2016/0327986 A1 | 11/2016 | Farahani et al. |
| 2017/0040306 A1 | 2/2017 | Kim et al. |
| 2018/0323021 A1* | 11/2018 | Lai ........................ H01H 13/06 |
| 2018/0366284 A1* | 12/2018 | Hao ................... H01H 13/7073 |

FOREIGN PATENT DOCUMENTS

| | | |
|---|---|---|
| JP | 2000348563 A | 12/2000 |
| JP | 2001111248 A | 4/2001 |
| JP | 2003197063 A | 7/2003 |
| JP | 2006092898 A | 4/2006 |
| JP | 2007213839 A | 8/2007 |
| JP | 2012153444 A | 8/2012 |

* cited by examiner

EQUIPMENT WITH KEYS HAVING TRIM AND ILLUMINATION

This patent application claims the benefit of provisional patent application No. 62/524,011, filed on Jun. 23, 2017, which is hereby incorporated by reference herein in its entirety.

FIELD

This relates generally to electronic equipment, and, more particularly, to electronic equipment with input devices such as keyboards.

BACKGROUND

Electronic equipment often contains keys. For example, laptop computers and detachable keyboards for tablet computers contain keys.

The incorporation of keys into electronic equipment can pose challenges. If care is not taken, keys may be uncomfortable to use or may be difficult to recognize.

SUMMARY

Electrical equipment such as a tablet computer cover, a laptop computer, or other equipment may include keys. Each key may have a key member. Key members may be formed from transparent polymer and may be provided with backlight illumination. Keys may be arranged in arrays to form keyboards.

Coatings such as opaque coating layers may be formed on the key members. Opaque coating layers may be patterned to form symbol-shaped openings associated with key labels. Opaque coating layers may also have recessed peripheral portions and other features to enhance the appearance of the keys.

In some configurations, metal coating layers may be incorporated into the keys. Key members may have outer surfaces and opposing inner surface on which patterned coating layers may be formed. Peripheral edge portions of the key members may extend between the outer and inner surfaces and may be coated with metal coating layers such as physical vapor deposition metal layers to form reflective metal trim structures. If desired, metal coating layers on the peripheral edges of the key members may extend under portions of the keys.

Backlight illumination for the keys may be formed form light sources such as light-emitting diodes. Light-emitting diodes may supply backlight illumination to key members directly or through light guide layers or other light modifying structures. Light sources such as light-emitting diodes may be mounted to a substrate such as a printed circuit substrate. Key press sensors on the printed circuit substrate may be formed from dome switches, touch sensors, force sensors, or other sensors that detect finger press input on the key members.

Fabric may be incorporated into the electrical equipment. For example, a layer of woven fabric or other fabric may be overlapped by the key members in a keyboard. The layer of fabric may have openings that overlap symbol-shaped key member coating layers so that backlight illumination may pass through the symbol-shaped openings.

DETAILED DESCRIPTION

Fabric, polymer sheets, printed circuits, molded plastic parts, and other structures may be used in forming items with keys. Keys may, for example, be incorporated into electronic equipment such as cellular telephones, tablet computers, wristwatch devices, laptop computers, media players, pendant devices, devices embedded in eyeglasses or other equipment worn on a user's head, or other electronic equipment, may be used in straps, cases, covers, or other accessories for electronic devices (e.g., a cover or other accessory that includes a keyboard), may be used in accessories such as headphones, may be used in seating having circuits or other furniture with circuitry for a home or office, may be used in forming a seat with circuitry, dashboard, or other item in a vehicle, may be used in forming part of embedded systems such as systems in which electronic equipment is mounted in kiosks, may be used in forming wearable items with circuitry such as necklaces, wrist bands, arm bands, shoes, or other items of clothing, may be used in forming other equipment with circuitry, or may be used in forming structures that implement the functionality of two or more of these items.

Keys may be used for gathering alphanumeric input and for gathering commands to adjust device functions (e.g., keys may be used as volume buttons, menu buttons, power buttons, etc.). Illustrative configurations in which keys are arranged in an array for forming an alphanumeric keyboard may sometimes be described herein as an example. This is, however, illustrative. Keys may be used for gathering any suitable user input.

Figure 1:
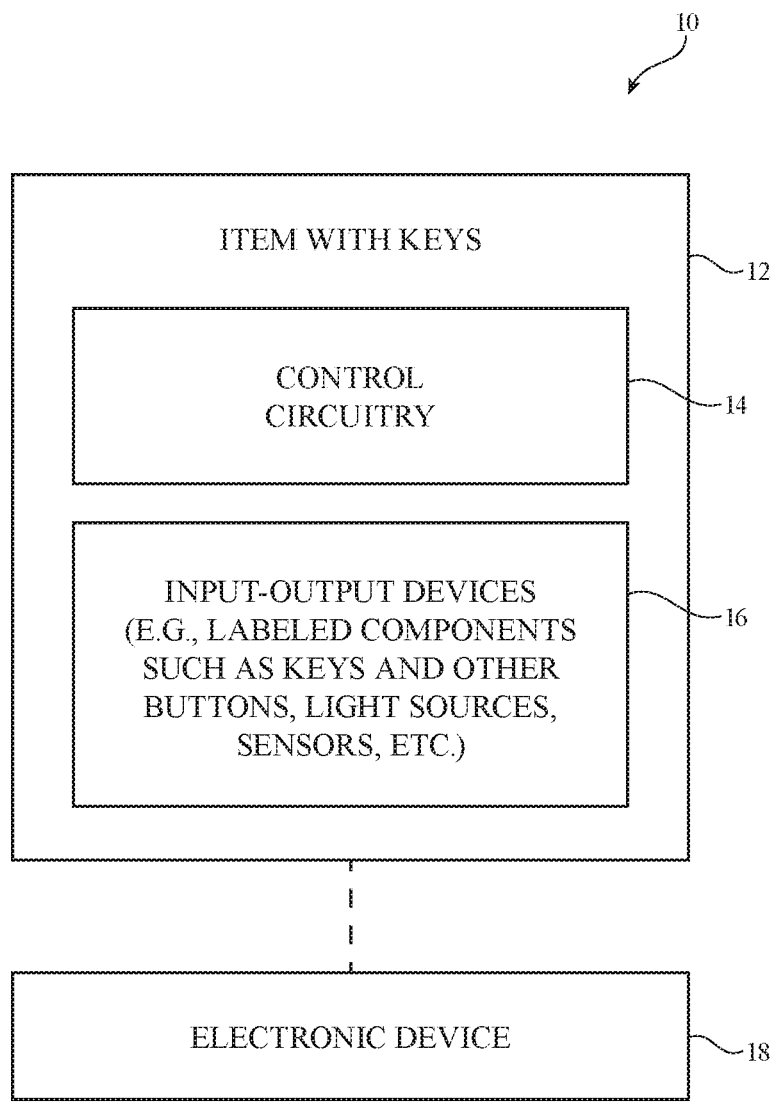
FIG. 1 is a schematic diagram of an illustrative item with keys in accordance with an embodiment.

Illustrative electronic equipment having keyboard keys or other keys is shown in FIG. 1. Equipment 10 may include a keyboard or other item with keys such as item 12. Item 12 may form part of an electronic device with a built-in keyboard such as a laptop computer or may be a stand-alone keyboard that can be coupled to optional additional electronic devices such as electronic device 18. For example, electrical equipment such as item 12 may be part of removable case (sometimes referred to as a cover) for a tablet computer and electronic device 18 may be a tablet computer. Electronic device 18 and item 12 may be mechanically coupled using magnets or other fasteners and can be electrically coupled using a wired and/or a wireless communications link. If desired, equipment 10 may be a cellular telephone, a wristwatch, a media player, a remote control, or other electronic equipment.

Item 12 may include layers of material such as layers of polymer, leather, glass, metal, fabric, and/or other materials. As an example, one or more of these layers may be used in forming a rear wall or other housing wall for a cover, for forming part of a wall of an electronic device, or for forming a wall that covers the upper surface of a keyboard in item 12. With one illustrative configuration the upper surface of a keyboard may have a fabric layer. This may help prevent moisture from entering the keyboard and may provide portions of the keyboard with an attractive fabric-like appearance.

Keyboard key members (e.g., plastic members formed from clear rigid polymer or key structures formed from other materials) may be attached to the outer surface of the fabric layer (as an example). The fabric of item 12 (e.g., a keyboard) may be soft (e.g., item 12 may have a fabric surface that yields to a light touch), may have a rigid feel (e.g., a fabric surface in item 12 may be formed from a stiff fabric), may be coarse, may be smooth, may have ribs or other patterned textures, and/or may be formed as part of a structure that has portions formed from non-fabric structures of plastic, metal, glass, crystalline materials, ceramics, or other materials.

Item 12 of equipment 10 (and, if desired, device 18) may include control circuitry such as control circuitry 14. Control circuitry 14 may include storage and processing circuitry for supporting the operation of item 12. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 14 may be used to gather keystroke information from an array of switches associated with an associated array of key members in an array of keys in a keyboard in item 12 and may otherwise be used to control the operation of item 12. The switches, which may sometimes be referred to as key press sensors, may be mechanical switches such as dome switches, may include capacitive touch sensors that form switches, may include force sensors that serve as switches, and/or may include other key actuation sensors that serve to monitor and detect key press input (key presses) by a user's fingers onto the keys. The processing circuitry may be based on one or more microprocessors, microcontrollers, digital signal processors, baseband processors and other wireless communications circuits, power management units, audio chips, application specific integrated circuits, etc.

Input-output circuitry in item 12 such as input-output devices 16 may be used to allow data to be supplied to item 12 and to allow data to be provided from item 12 to external devices. During operation, control circuitry 14 may use keys and other input-output devices 16 to gather input from a user, external equipment, and/or the environment around item 10. Control circuitry 16 may also use input-output devices 16 to provide output to a user or external equipment such as device 18.

Input-output devices 16 may include keyboard keys and other buttons, joysticks, scrolling wheels, touch pads, key pads, microphones, speakers, tone generators, vibrators, cameras, sensors such as touch sensors, capacitive proximity sensors, light-based proximity sensors, ambient light sensors, compasses, gyroscopes, accelerometers, moisture sensors, force sensors, data ports, displays, and other input-output devices.

Keys such as keyboard keys, status indicators, displays, trim structures, and other portions of equipment 10 may be illuminated. For example, light-emitting diodes, lamps, electroluminescent panels, or other sources of light in an electronic device may be used in illuminating patterned openings. The patterned openings may pass through layers of fabric, may be formed on keyboard key members, and/or may be formed from other materials in equipment 10.

The patterned openings may form symbols (e.g., letters and other alphanumeric characters, icons, etc.) or other illuminated shapes. The symbols or other patterned openings may form labels on keys or other input-output devices (sometimes referred to as glyphs or alphanumeric labels), may form labels on other illuminated structures, may form trim for a component (e.g., a halo surrounding a key), or may form other suitable illuminated areas. In some arrangements, transparent material (e.g., clear material, translucent material, and/or material that includes photoluminescent substances such as phosphors) may be formed in an opening and/or may overlap an opening. Light-transmitting windows in opaque structures may be formed from openings and optional transparent material overlapping the openings.

Arrangements in which keyboard keys in a keyboard in equipment 10 have patterned openings or other transparent structures that form illuminated letters or other symbols that serve as labels for the keys may sometimes be described herein as an example. In general, however, input-output devices 18 may include one or more light sources that provide any suitable type of illumination for keys in equipment 10.

Figure 2:
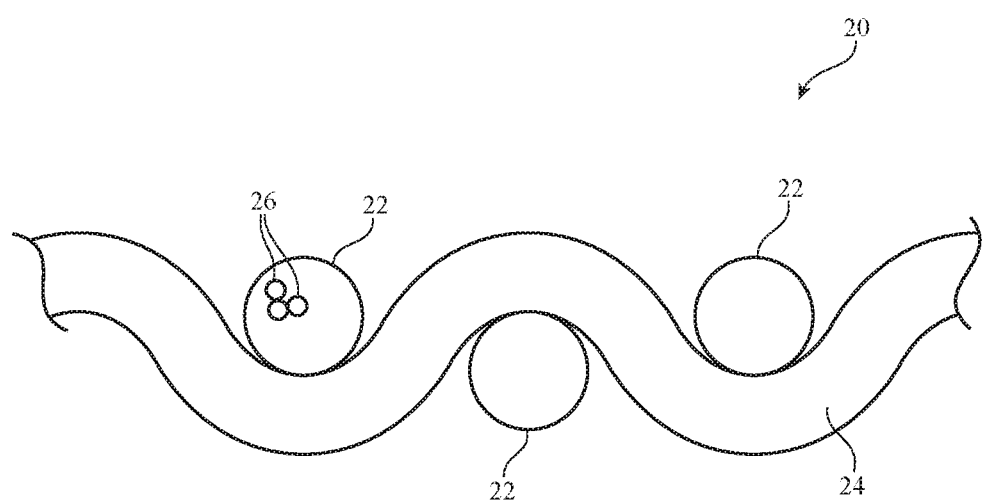
FIG. 2 is a cross-sectional side view of illustrative fabric in accordance with an embodiment.

Fabric for equipment 10 may be formed from intertwined strands of material. A cross-sectional side view of an illustrative layer of fabric for equipment 10 is shown in FIG. 2. As shown in FIG. 2, fabric 20 may include strands of material such as strands 22 and strands 24. With one suitable arrangement, fabric 20 may be a woven fabric (e.g., strands 22 may be warp strands and strands 24 may be weft strands). In general, fabric 20 may be woven, knitted, braided, may be intertwined to form felt, or may contain strands of material that have been intertwined using other intertwining techniques. In some arrangements, fabric 20 may include coatings (e.g., polymer coatings to prevent accumulation of dirt, materials that serve as moisture barrier layers, wear resistant coatings, transparent coatings such as patterned translucent coatings, etc.). These coating materials may penetrate into fabric 20 and/or may form layers on the inner and/or outer surfaces of fabric 20.

The strands of material that form the fabric may be monofilaments or may be multifilament strands. As shown in the illustrative configuration of fabric 20 of FIG. 2, for example, strands such as strands 22 and 24 may be formed from strands of yarn that each contain multiple monofilaments 26. Strands of material for fabric 20 may be formed from metal or other conductive materials, polymer, natural materials such as cotton, or other suitable materials.

Figure 3:
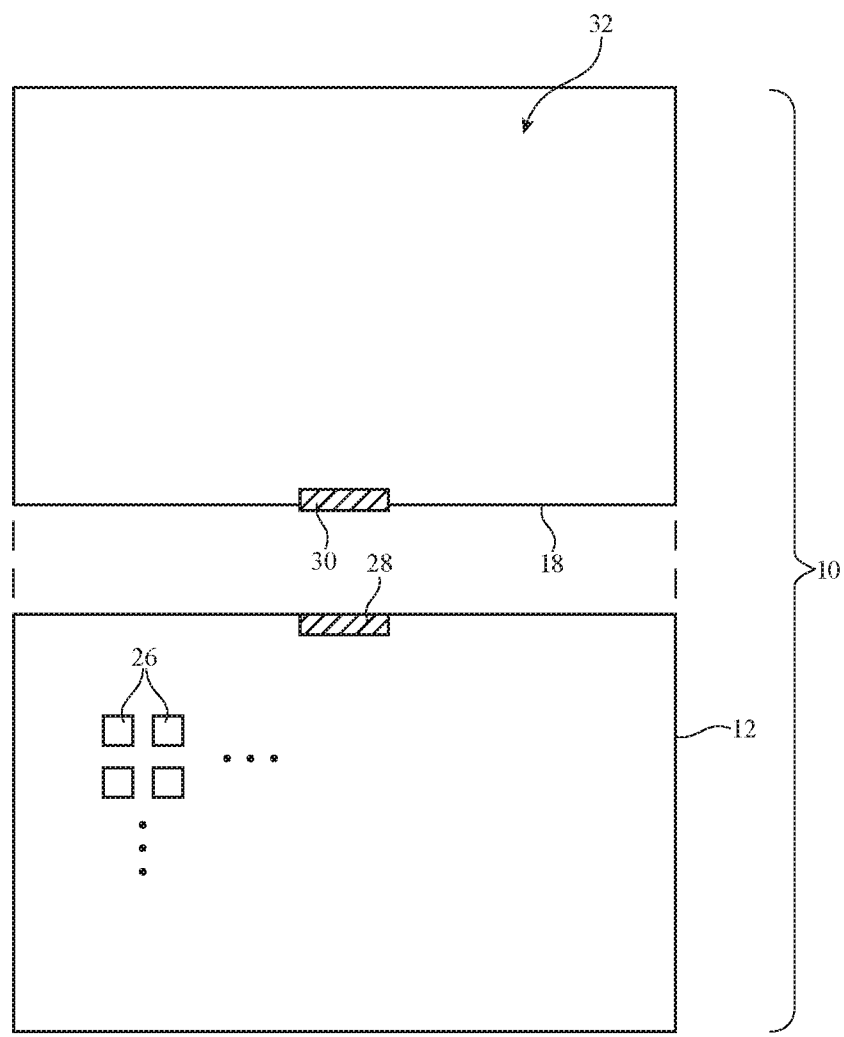
FIG. 3 is a diagram of illustrative electronic equipment including a keyboard in accordance with an embodiment.

FIG. 3 is a diagram showing how item 12 may be a keyboard that is attached to mating equipment such as device 18. Device 18 may be, for example, a tablet computer having a touch screen display such as display 32. Item 12 may be a stand-alone keyboard, a keyboard that forms part of a case (e.g., a protective cover), and/or may be part of other accessory equipment configured to operate with device 18. Device 18 may be coupled to item 12 wirelessly and/or may have a connector such as connector 30 that mates with a corresponding connector in item 12 such as connector 28. If desired, magnets or other fastening mechanisms may be provided in item 12 and device 18 to hold item 12 and device 18 together. Item 12 may have a rectangular shape and may, if desired, have a folding flap (e.g., when item 12 forms part of a cover for device 18).

Item 12 may have an array of keyboard keys such as keys 26. Keys 26 may be arranged on keyboard 26 using a QWERTY layout or other suitable layout.

Figure 4:
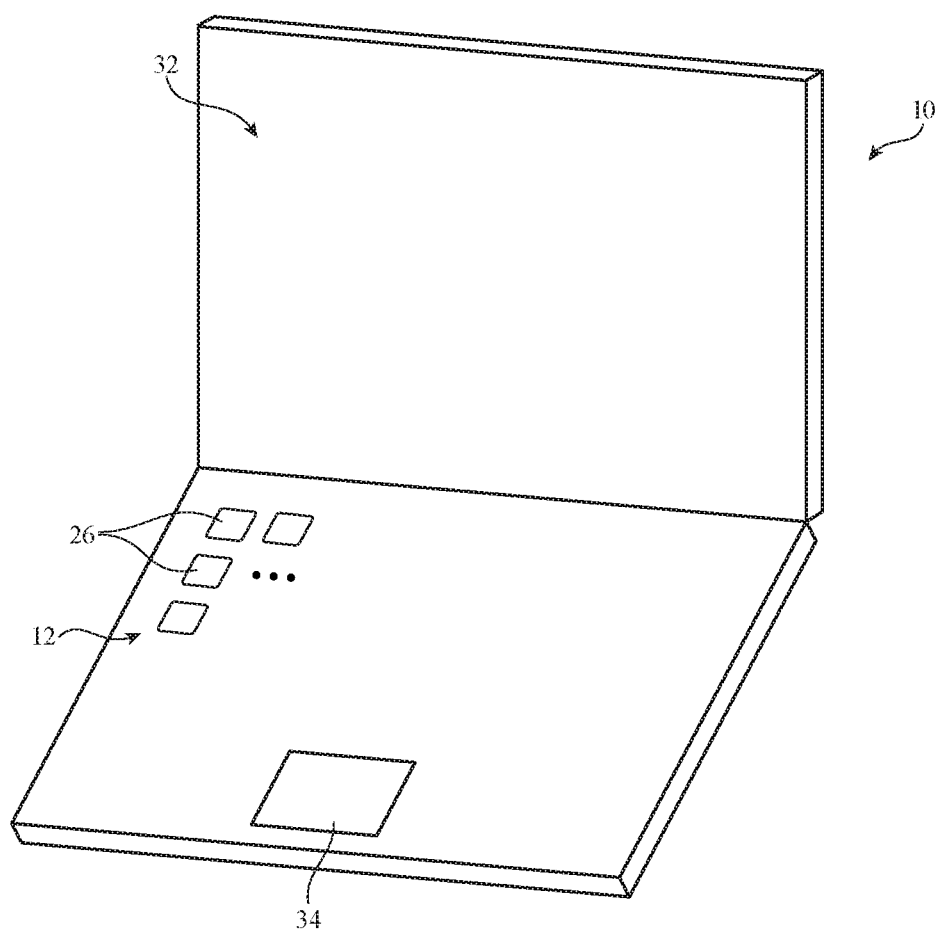
FIG. 4 is a perspective view of an illustrative laptop computer with a keyboard in accordance with an embodiment.

FIG. 4 is a perspective view of electronic equipment 10 in an illustrative configuration in which equipment 10 is an electronic device such as a laptop computer. As shown in FIG. 4, equipment 10 may have an upper housing portion that forms a lid containing display 32 and a lower housing portion that includes track pad 34 and a keyboard (item 12) formed from an array of keys 26.

The arrangements for equipment 10 shown in FIGS. 3 and 4 are merely illustrative. In general, any suitable electronic devices may be provided with one or more keys such as keys 26.

Figure 5:
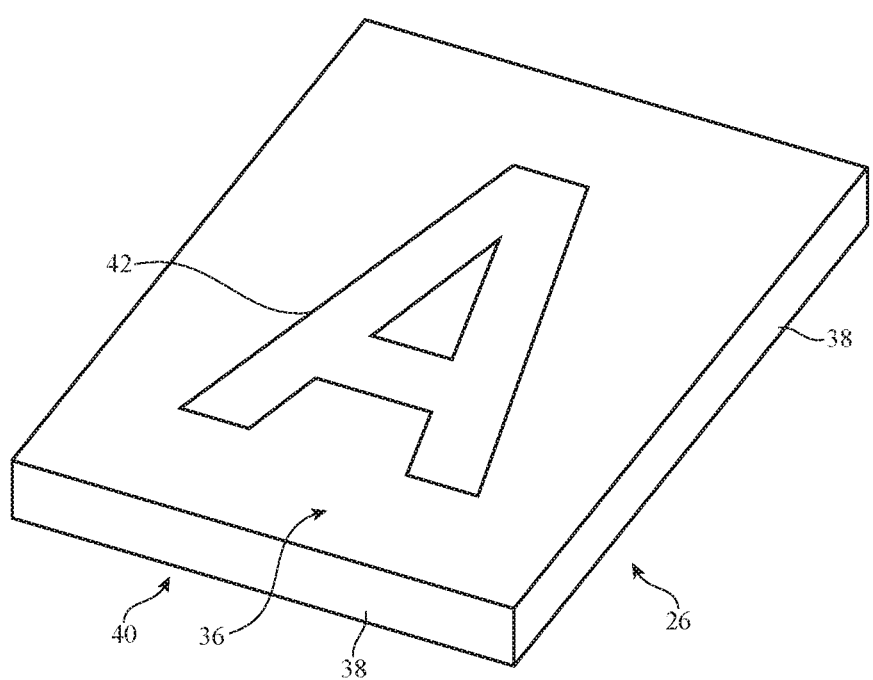
FIG. 5 is a perspective view of an illustrative key in accordance with an embodiment.

A perspective view of an illustrative key is shown in FIG. 5. As shown in FIG. 5, key 26 may include a key member having an upper surface such as upper surface 36 (sometimes referred to as an outer surface, exterior surface, or outwardly facing surface), an opposing lower surface 40 (sometimes referred to as an inner surface, interior surface, or inwardly facing surface), and peripheral sidewall surfaces 38. Coatings and/or other structures in key 26 may be patterned to form a symbol such as symbol 42. Symbol 42 may be an alphanumeric character, an icon, or other label for key 26. In some configurations, key 26 may be illuminated. For example, key 26 may be illuminated with light so that light is emitted from symbol 42 or so that light is emitted from portions of upper surface 36 surrounding symbol 42. If desired, the periphery of key 26 may be illuminated (e.g., to produce a halo effect). Peripheral illumination may be emitted through peripheral portions of upper surface 36, through portions of lower surface 40, and/or through some or all of the edge portions of key 26 such as sidewall surfaces 38. Symbol 42 may be formed from openings and/or solid regions in one or more coating layers, by forming perforations and/or other openings in underlying layers such as a fabric layer in a keyboard, and/or from other patterned structures.

An exploded cross-sectional side view of an illustrative key for equipment 10 is shown in FIG. 4. As shown in FIG. 4, a viewer such as viewer 70 may view key 26 in direction 72. Keyboard key 26 may include a key member such as key member 74. When a user desires to supply input with key 26, the user may use a finger or other external object to press downward in direction 72 on upper surface 36 of key member 74. A key press sensor may be used to detect when key 26 has been pressed. The key press sensor may, as an example, be formed from a switch such as dome switch 58. Switch 58 may be compressed when key member 74 moves downwardly and may supply an upward restoring force when key member 74 is released. Dome switch 58 or other suitable sensor in key 26 may be placed in either a closed state or open state. Dome switches 58 and other key press sensors in a keyboard in equipment 10 may be mounted to a substrate such as printed circuit 64. Control circuitry 14 may be coupled to printed circuit 64 and may monitor the state of switches 58 to determine whether keys 26 have been depressed.

Key member 74 may be attached to upper surface 76 of layer 78 (e.g., using adhesive). Layer 78 may be a layer of fabric such as fabric layer 20 of FIG. 2 or may be formed from one or more other layers of material (e.g., a flexible polymer sheet or other polymer layer, a layer of metal, ceramic, glass, etc.). One or more coating layers may be formed on layer 78, on key member 74 and/or on key support structures and other structures in key 26. Layer 78 and the coating layers on key member 74 and other portions of key 26 may include layers of metal, polymer (e.g., polymer containing pigments and/or dyes, clear polymer, etc.), and/or other layers of material.

Keyboard key member 74 may have a rectangular footprint (outline when viewed in direction 72) or may have other suitable shapes. To enhance the ability of layer 78 to flex to accommodate vertical up and down movement of key member 74, flexibility enhancement structures may be incorporated into layer 78. For example, grooves or ridges in layer 78 and/or openings in layer 78 may run along the periphery of key member 74. These flexibility enhancement structures may locally enhance the flexibility of layer 78 to accommodate movement of key member 74 without distorting the planar upper surface of layer 78.

Key member 74, which may serve as a smooth and rigid capping structure at the top of key 26, may sometimes be referred to as a key cap. Key member support structure 46, which may be used to support key member 38 and help maintain upper surface 36 of key member 74 parallel to the plane of a keyboard in which key 26 is formed, may sometimes be referred to as a structural key cap.

As shown in FIG. 4, key member support structure 46 may have protrusions such as legs 48 that engage with corresponding arms of a key spring mechanism such as butterfly hinge mechanism 50 or other keyboard key mechanism for supporting key member 38 during operation of key 26. Butterfly mechanism 50 may be mounted on printed circuit board 64 (e.g., a flexible printed circuit formed from a sheet of polyimide or a flexible substrate formed from a layer of other flexible polymer or a rigid printed circuit board formed from a layer of fiberglass-filled epoxy or other rigid printed circuit board substrate material). Dome switch 58 may be mounted to printed circuit 64 in the center of hinge mechanism 50 and key housing structure 60 (sometimes referred to as a key base, key housing structures, key support structures, etc.). Structure 60 may have flexible portions (e.g., elastomeric portions) that allow dome switch 58 to flex and/or may have light guiding structures (e.g., clear polymer structures forming a light guide layer or other light distribution structures) that help distribute illumination for key 26.

Figure 6:
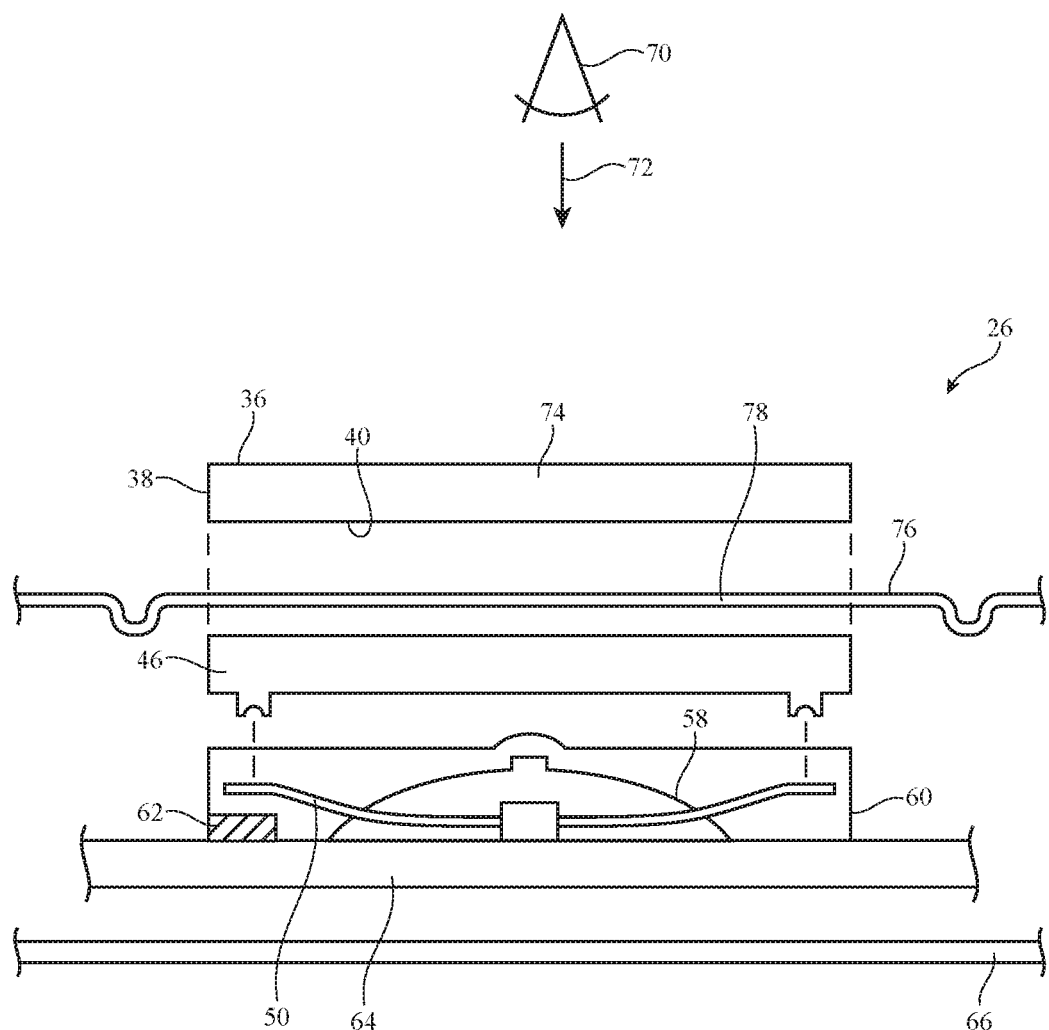
FIG. 6 is a cross-sectional side view of an illustrative key in accordance with an embodiment.

If desired, other key support and key sensing mechanisms may be used for forming key 26. For example, key member 74 may be supported without using structures such as hinge mechanism 50, key movement may be sensed using force and/or touch sensors, and/or other arrangements for forming key 26 from key member 74 may be used. The example of FIG. 6 is merely illustrative.

Each key 26 in item 12 may have an associated symbol. One or more light sources such as light-emitting diode 62 may be used to illuminate the symbol for each key 26. Light from light-emitting diode 62 may, if desired, be distributed laterally using a clear light guide structure in key 26. In other configurations, light emitting diode(s) such as diode 62 may be mounted directly under key member 36 and may supply direct backlight for key member 36.

Light-emitting diodes such as diode 62 may emit light of any suitable color (white, red, green, blue, etc.). If desired blue pump light or other pump light may be supplied by diode 62 to pump phosphorescent material in key 26.

Figure 7:
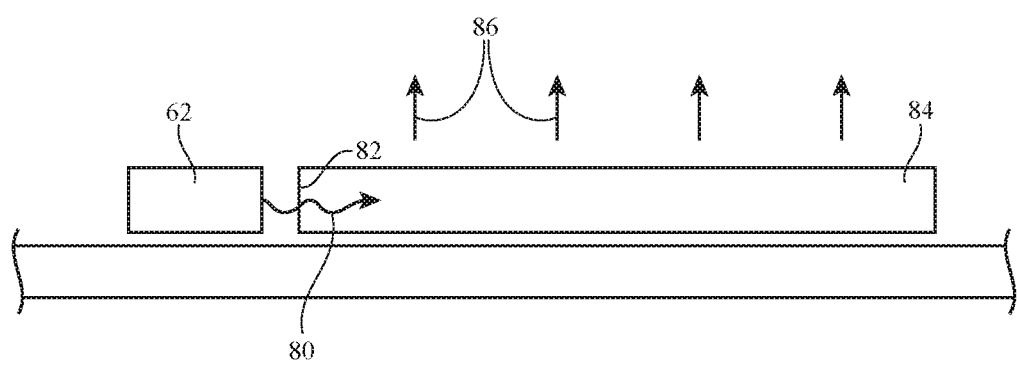
FIG. 7 is a cross-sectional side view of an illustrative light guide structure for illuminating a key in accordance with an embodiment.

Light-emitting diodes 62 may be mounted on printed circuit 64. As shown in FIG. 7, light-emitting diode 62 may, if desired, emit light 80 into edge 82 of a light guiding structure such as light-guide layer 84, which may have light-scattering features that scatter the light upwardly to provide backlight illumination to illuminate key 26, as illustrated by light 86.

Figure 8:
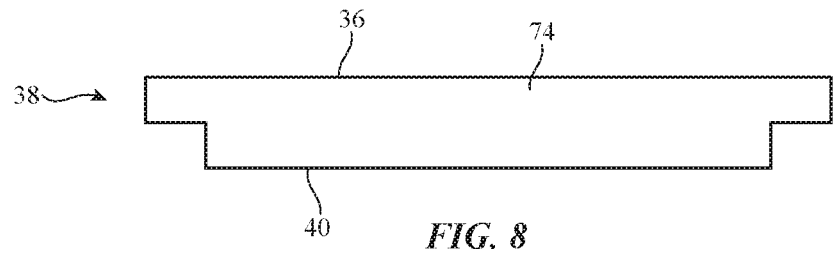
FIGS. 8, 9, 10, and 11 are cross-sectional side views of illustrative keys in accordance with embodiments.

Illustrative cross-sectional profiles for key member 74 are shown in FIGS. 8, 9, 10, and 11. In the example of FIG. 8, upper surface 36 (sometimes referred to as an outer surface, exterior surface, or outwardly facing surface) and lower surface 40 (sometimes referred to as an inner surface, interior surface, or inwardly facing surface) are flat and parallel to each other. Sidewall surface 38 of FIG. 8 has a stepped configuration, so that key member 74 of FIG. 8 has a mushroom shape.

Figure 9:
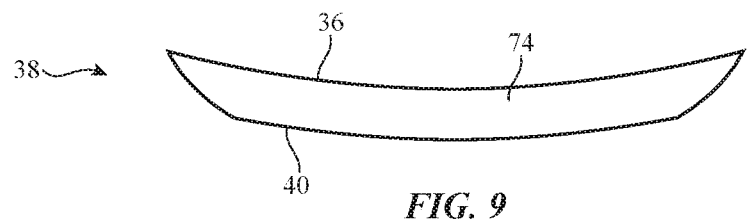

In the example of FIG. 9, sidewall surfaces 38 of key member 74 are angled so that the sides of key member 74 are tapered (e.g., key member 74 has a tapered cross-sectional profile). Upper surface 36 and lower surface 40 may be curved as shown in FIG. 9 or may have other shapes.

Figure 10:
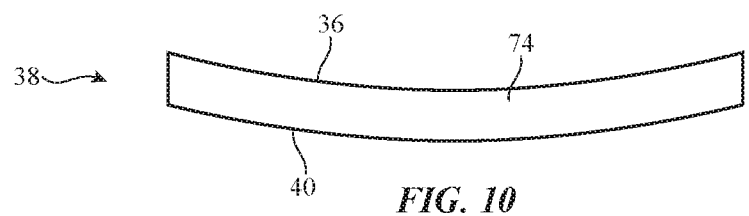

FIG. 10 shows how key member 74 may have vertically extending sidewall surfaces 38. Upper surface 36 may be curved and lower surface 40 may be curved or surfaces 36 and 40 may have other shapes.

Figure 11:
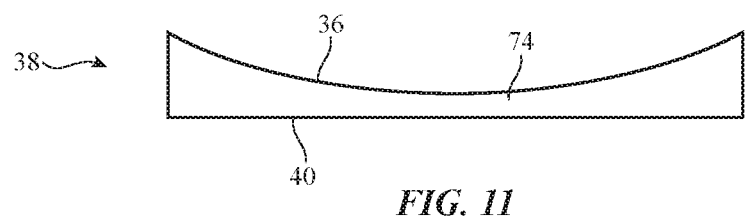

FIG. 11 shows how upper surface 36 may be curved (e.g., concave) and lower surface 40 may be planar. Sidewall surfaces 36 may be vertical or may have other shapes.

Other illustrative configurations may be used for key members 74, if desired. For example, other combinations of stepped, tapered, and/or vertical sidewalls, planar and/or curved upper surfaces, and/or planar and/or curved lower surfaces may be used for key members 74.

Figure 12:
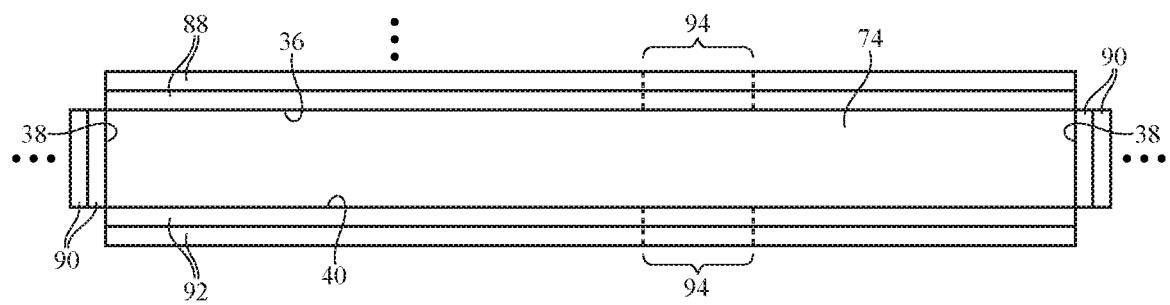
FIG. 12 is a cross-sectional side view of a key with illustrative coating layers in accordance with an embodiment.

One or more coating layers may optionally be formed on each of the surfaces of key member 74. As shown in FIG. 12, for example, key member 74 may optionally have one or more coating layers 88 on upper surface 36, one or more coating layers 90 on sidewall surfaces 36, and/or may have one or more coating layers 92 on lower surface 40. These layers may be formed from metal, polymer, glass, ceramic, and/or other materials and may be deposited using printing, dripping, dipping, spraying, physical vapor deposition (e.g., evaporation and/or sputtering), atomic layer deposition, electroplating, and/or other deposition techniques and may be patterned using shadow masking during deposition, photolithography, laser processing (e.g., laser ablation), drilling, grinding, sawing, milling, and/or other mechanical patterning techniques, and/or other patterning techniques. These patterning techniques may be used to form openings that pass through one or more of coating layers 90, 88, and/or 92, as illustrated by openings 94 in upper surface coating layers 88 and lower surface coating layers 94 of FIG. 12.

Openings 94 may be patterned to form decorative trim, to define key symbols such as illustrative key symbol 42 of FIG. 5, and/or to form other visual features on keys 26. In some configurations, key member 74 may be formed from a polymer (e.g., clear polycarbonate, etc.) and may be polished before and/or after forming patterned coating layers on key member 74 (e.g., using vapor polishing techniques).

Illustrative coating layers 88, 90, and 92 are shown as being formed on the surfaces of key member 74 in the example of FIG. 12. If desired, patterned coating layers for defining symbols, decorative trim, and/or other structures in key 26 may be formed on other layers in item 12 (e.g., the upper and/or lower surfaces of layer 78 of FIG. 6, the upper and/or lower surfaces of member 46 of FIG. 6, on portions of key housing structure 60, on light-guide plate structures, etc.). The configuration of FIG. 12 is illustrative.

Figure 13:
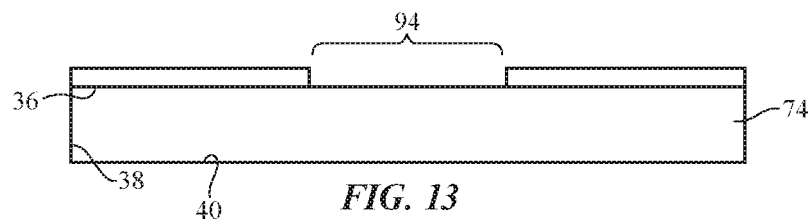
FIGS. 13, 14, 15, 16, and 17 are cross-sectional side views of illustrative coated keys in accordance with embodiments.

As shown in FIG. 13, a patterned coating such as coating layer 88 of FIG. 13 may have open areas such as opening 94. Coating layer 88 may be opaque and member 74 may be transparent. Opening 94 may have the shape of an alphanumeric character or other symbol or other suitable shape. Using a light source such as light-emitting diode 62 (e.g., in a direct-lit or light guide layer configuration), backlight illumination may be provided to the underside of key member 74 during operation. The backlight illumination may illuminate the symbol or other pattern formed by opening 94, thereby allowing a user of equipment 10 to view opening 94 in low lighting conditions (e.g., so that the user may identify key 26). Peripheral edge surface 38 and lower surface 40 of key member 74 are uncoated (e.g., free of opaque coating material) in the example of FIG. 12, so backlight illumination may be emitted from the edges of key member 74 and/or from the undersides of portions of key member 74 (e.g., after this illumination has passed through clear portions of member 74 and/or been guided through portions of member 74 due to the principal of total internal reflection). Light emitted from the edges and/or underside of key member 74 may form peripheral illumination (e.g., an illuminated halo on layer 78 around key 26, illuminated key edges, etc.). The presence of backlight illumination passing through opening 94 and other illumination of key 26 may help a user view key 26 and/or identify a symbol formed from opening 94 on key 26 even in low lighting conditions. Backlight illumination may also enhance the appearance of key 26.

Figure 14:
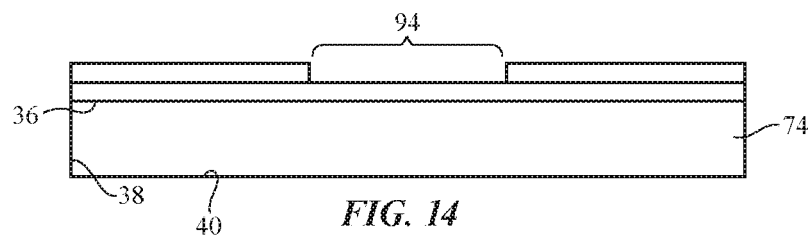

If desired, opening 94 may pass only partway through the coating layers on key member 74. As shown in FIG. 14, for example, opening 94 may pass through upper coating layer 88A without passing through lower coating layer 88B. Layer 88A may be opaque. For example, layer 88A may be black. Layer 88B may have a color (white, red, etc.) and may be sufficiently transparent to allow backlight illumination to pass through layer 88B in portions of layer 88B that are aligned with opening 94 and not covered by layer 88A. Layer 88B may be hazy to help diffuse light passing through layer 88B. Arrangements in which layers 88A and/or 88B have other colors or optical characteristics may also be used. If desired, layers 88A and 88B may be formed by attaching a two-layer film to member 74 with adhesive. Configurations in which layers 88A and 88B are deposited using printing and other techniques may also be used.

Figure 15:
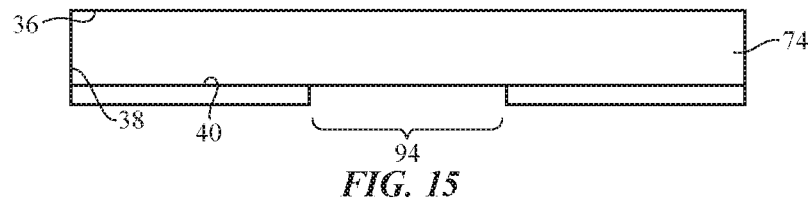
Figure 16:
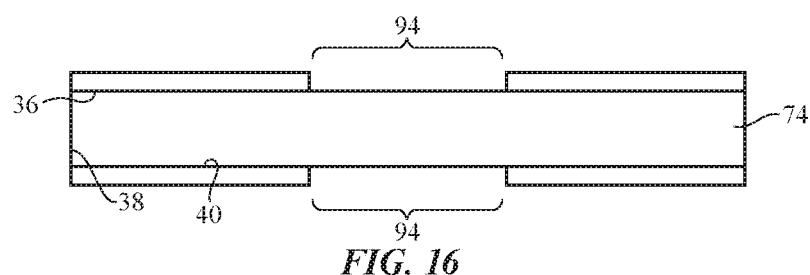

FIG. 15 shows how a patterned opening such as opening 94 (e.g. a symbol, decorative trim, etc.) may be formed on lower surface 40 of member 74. Sidewall coatings may also be patterned on surface 38, if desired. In general, one or more surfaces of member 74 such as surfaces 36, 38, and/or 40 may be coated simultaneously and/or may be uncoated. FIG. 16 shows an illustrative configuration for member 74 in which upper surface 36 and lower surface 40 are coated and have uncoated regions such as openings 94 that are at least partly aligned with each other and that therefore overlap each other.

Figure 17:

As shown in FIG. 17, the uncoated areas of member 74 may, if desired, surround one or more coated areas. For example, opening 94 may surround a solid portion of coating layer 88 (e.g., an opaque coating layer) so that key 26 appears to be illuminated everywhere except for a central dark region having the shape of a symbol (e.g., key 26 may have dark on light lettering).

Figure 18:
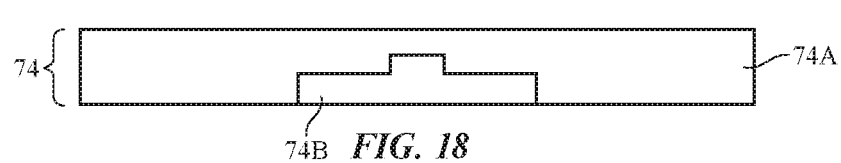
FIG. 18 is a cross-sectional side view of an illustrative key with an inset region in accordance with an embodiment.

If desired, one or more different materials may be used in forming one or more different respective portions of key member 74. As shown in FIG. 18, for example, key member 74 may be formed from multiple shots of plastic (e.g., first polymer portion 74A and second polymer portion 74B). Portions 74A and 74B may have different optical properties (e.g., different light transmission values, different reflectivities, different light absorption values, different colors, etc.). As an example, portion 74B may be opaque and may have the shape of a symbol or other shape and portion 74A may be transparent so that portion 74B may be viewed through portion 74A or vice versa. Portions such as portion 74B may be formed at the top of portion 74A, at the bottom of portion 74A, in the middle of portion 74A, and/or may extend through portion 74A from upper surface 36 to lower surface 40. Portions such as portion 74B may be formed from polymer, glass, metal, ceramic, and/or other materials. With one illustrative arrangement, portion 74B may be inserted molded into portion 74A.

Figure 19:
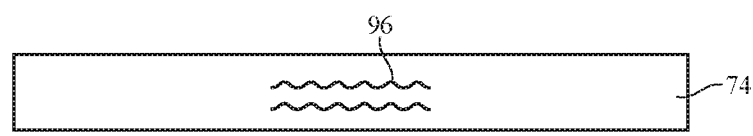
FIG. 19 is a cross-sectional side view of an illustrative key with laser-marked regions such as interior laser-marked regions in accordance with an embodiment.

In the example of FIG. 19, key member 74 has laser-marked portions such as markings 96 that have been formed by laser light exposure. Laser light may be focused onto the surfaces of key member 74 and/or may be focused internally. When light is focused internally, laser markings such as markings 96 may be created without damaging the exterior surfaces of member 74 because the intensity of the light is lower on the exterior surfaces of member 74 than in the interior of member 74. As a result, two-dimensional and/or three-dimensional internal structures can be formed from the laser markings (e.g., to form symbols, decorative trim, etc.). Light may be scattered from these laser-processed structures when backlight illumination is applied to key member 74.

Figure 20:
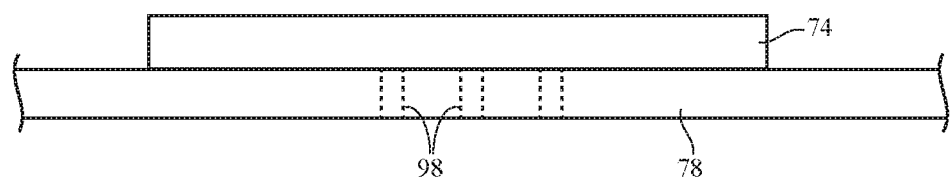
FIG. 20 is a cross-sectional side view of an illustrative key on a layer such as a fabric layer with perforations in accordance with an embodiment.

If desired, layer 78 may be provided with openings such as openings 98 of FIG. 20. Openings 98 may be perforations that are collectively used to define a symbol shape or other desired shape or may include one or more symbol-shaped and/or trim-shaped openings. Layer 78 may be opaque and the presence of openings 98 may allow backlight illumination to reach member 74.

Figure 21:
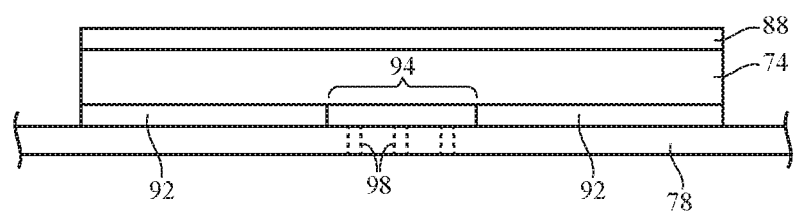
FIG. 21 is a cross-sectional side view of an illustrative key with coating layers that is supported on a layer such as a fabric layer with perforations in accordance with an embodiment.

As shown in FIG. 21, one or more coating layers such as illustrative coating layers 88 and 92 may be included on member 74 that have one or more openings in alignment with openings 98. For example, layer 92 of FIG. 21 may be opaque and may have an opening 94 in the shape of a symbol that is aligned with one or more overlapped openings 98 in layer 78. Layer 88 may be a transparent layer (e.g., a coating formed from silicon oxide, aluminum oxide, titanium oxide, and/or other inorganic materials) and may form a hard and/or smudge-resistant coating.

Figure 22:
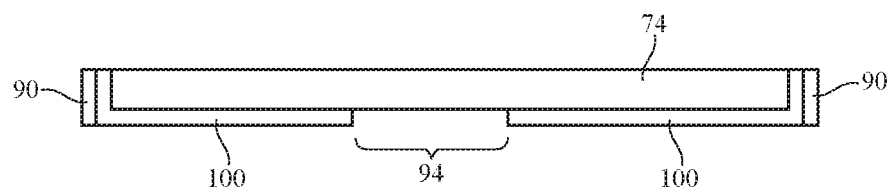
FIG. 22 is a cross-sectional side view of an illustrative key with trim structures in accordance with an embodiment.

In some configurations, reflective structures may be incorporated into key 26. For example, sidewall surfaces 38 or other peripheral regions of keys 26 may be provided with reflective coatings such as metal coatings. The metal may, for example, form a shiny peripheral trim structure that extends around the periphery of key 26 (e.g., on some or all of sidewall edge surfaces 38, etc.). An arrangement of this type is shown in FIG. 22. In the example of FIG. 22, coating layer 100 may be formed from an opaque material (e.g., black ink) and may have an opening 94 (e.g., a symbol-shaped opening). Coating layer 90 may be a metal layer (e.g., a metal layer deposited by physical vapor deposition, a press-fit metal ring, a metal foil that has been attached to member 74 using adhesive, and/or other metal structure).

Figure 23:
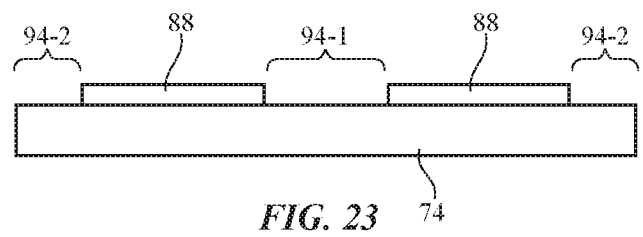
FIG. 23 is a cross-sectional side view of an illustrative key with top coating that is recessed along the edges of the key in accordance with an embodiment.

If desired, coatings may be recessed relative to peripheral edge surface 38. As shown in FIG. 23, for example, upper coating layer 88 may have a symbol-shaped opening such as opening 94-1 and may have recessed peripheral portions forming opening 94-2. Opening 94-2 may form a peripheral uncoated area (e.g., a rectangular border for key member 74) that is free of opaque material and that is therefore transparent to backlight illumination.

Figure 24:
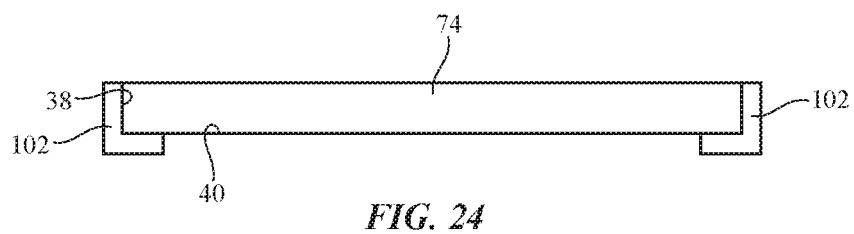
FIGS. 24, 25, 26, and 27 are cross-sectional side views of illustrative keys with peripheral trim structures in accordance with embodiments.

FIG. 24 shows how a layer such as layer 102 (e.g., a metal layer or other material) may have portions that overlap edge 38 and that have portions that extend partly under member 74 and that overlap peripheral areas of lower surface 40.

Figure 25:
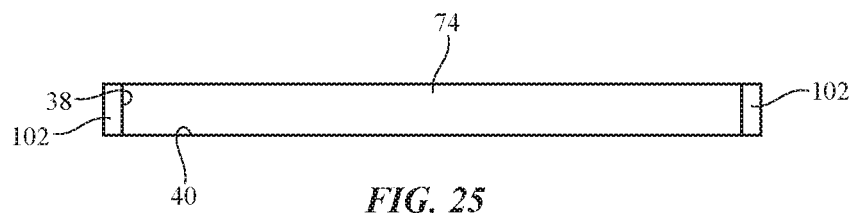

In the example of FIG. 25, layer 102 (e.g., a metal layer such as a physical vapor deposition metal layer) coats only edge surface 38.

Figure 26:
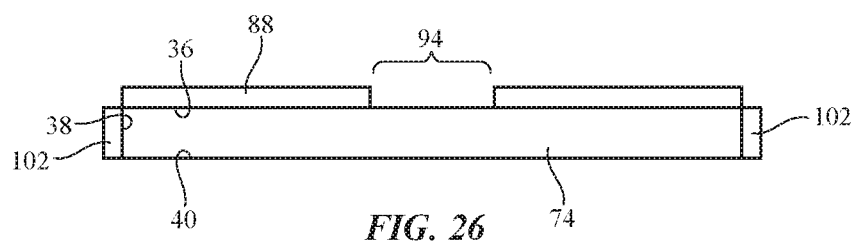

FIG. 26 shows how upper coating 88 may have an opening such as opening 94 (e.g., a symbol shaped opening) and may cover upper surface 36 while lower surface 40 is at least partly free of coating material and edge surface 38 is coated with layer 102 (e.g., a metal coating such as a physical vapor deposition metal layer). In this arrangement, layer 88 (e.g., an opaque layer such as a layer of black ink) may define the shape of a key symbol or other shape for opening 94 and metal coating layer 102 may form an attractive peripheral key trim.

Figure 27:
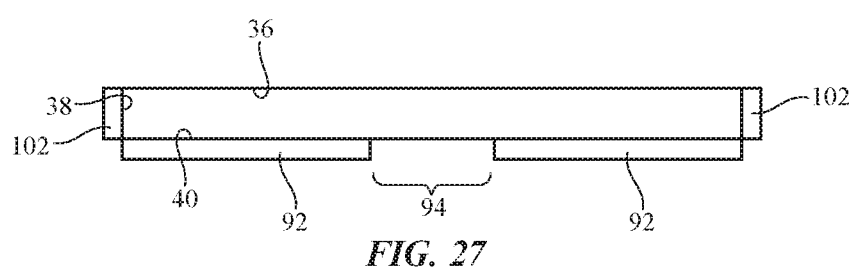

FIG. 27 shows how a symbol-shaped opening such as opening 94 may be formed in a coating layer such as layer 92 that is formed on lower surface 40 (e.g., while upper surface 36 is free of opaque coatings, etc.). Metal edge coating layer 102 of FIG. 27 may serve as decorative trim.

In general, any or all of the patterned coating arrangements of FIGS. 12-27 may be used in conjunction with any or all of the illustrative key member configurations for key member 74 that are shown in FIGS. 8-12 and/or additional coating patterns and/or key member structures may be used for keys 26. The configurations of FIGS. 8-27 are merely illustrative.

The foregoing is merely illustrative and various modifications can be made to the described embodiments. The foregoing embodiments may be implemented individually or in any combination.

What is claimed is:

1. Electrical equipment, comprising:
    an array of keys each of which includes a key press sensor and a key member; and
    a layer of material having a first surface facing the key members and having an opposing second surface facing the key press sensors; and
    light sources that provide backlight illumination for the keys, wherein each key member includes a coating layer with a symbol-shaped opening and each key member is surrounded by a metal trim that forms an exterior surface of the key member.

2. The electrical equipment defined in claim 1 wherein each key member has a peripheral edge surface and wherein the metal trim of each key member is formed from a metal coating layer on the peripheral edge surface and a portion of the coating layer is interposed between the metal trim and the key member.

3. The electrical equipment defined in claim 2 wherein each key member has opposing outer and inner surfaces and wherein a portion of the metal coating layer on each key member extends from the peripheral edge surface over a portion of the inner surface of that key member.

4. The electrical equipment defined in claim 2 wherein each key member has opposing outer and inner surfaces, the inner surface facing the layer of material, and wherein the coating layer with the symbol-shaped opening of each key member is formed on the outer surface.

5. The electrical equipment defined in claim 2 wherein each key member has opposing inner and outer surfaces, the inner surface facing the layer of material, and wherein the coating layer with the symbol-shaped opening of each key member is formed on the inner surface.

6. The electrical equipment defined in claim 2 wherein the metal coating layer on the peripheral edge surface of each key member comprises a physical vapor deposition metal coating layer.

7. The electrical equipment defined in claim 2 wherein the key member comprises clear polymer and wherein the layer of material comprises fabric with an opening overlapped by the symbol-shaped opening.

8. The electrical equipment defined in claim 1 wherein each key member has a peripheral edge surface, wherein each key member has an inner surface facing the layer of material and has an opposing outer surface, and wherein the coating layer with the symbol-shaped opening is formed on the outer surface and is recessed from the peripheral edge surface.

9. The electrical equipment defined in claim 1 wherein each key member comprises transparent polymer.

10. The electrical equipment defined in claim 9 wherein the layer of material comprises woven fabric.

11. The electrical equipment defined in claim 1 wherein the light sources comprise light-emitting diodes, the electrical equipment further comprising a printed circuit coupled to the light-emitting diodes and the key press sensors, and wherein the key press sensors comprise dome switches.

12. The electrical equipment defined in claim 1 wherein the keys have sidewall surfaces with stepped cross-sectional profiles.

13. The electrical equipment defined in claim 1 wherein the keys have sidewall surfaces that are angled to form a tapered cross-sectional profile for each key member.

14. The electrical equipment defined in claim 1 wherein the layer of material comprises a layer of fabric and wherein each key member comprises a polymer member with a concave outer surface and an opposing planar inner surface facing the layer of fabric.

15. An apparatus, comprising:
a printed circuit;
a key press sensor on the printed circuit;
a layer of material that overlaps the key press sensor;
a key member having first and second opposing surfaces, wherein the first surface is on the layer of material and the layer of material is interposed between the key member and the key press sensor; and
metal on the key member, wherein the metal extends from the first surface of the key member to the second surface of the key member and the first surface and second surface are each at least partly not overlapped by the metal.

16. The apparatus defined in claim 15 wherein the layer of material comprises fabric.

17. A keyboard, comprising:
a fabric layer;
an array of clear key members attached to the fabric layer, wherein each clear key member has a peripheral edge surface;
a metal trim on each peripheral edge surface, wherein each clear key member is interposed between a first portion of the metal trim and a second portion of the metal trim;
a coating layer on each clear key member that forms a symbol; and
light sources that provide backlight illumination to the array of clear key members.

18. The keyboard defined in claim 17 wherein the coating layer on each clear key member comprises an opaque coating layer having a symbol-shaped opening that forms the symbol, wherein the fabric layer has openings, and wherein the symbol-shaped opening in the coating layer on each clear key member is overlapped by a respective one of the openings in the fabric layer.

19. The keyboard defined in claim 18, wherein each key member has an upper surface and a lower surface, the lower surface faces the fabric layer, and the metal trim does not overlap the lower surface of the key member.

20. The keyboard defined in claim 17 wherein the coating layer on each clear key member comprises an opaque coating layer having a symbol-shaped opening that forms the symbol, the fabric layer has openings, the symbol-shaped opening in the coating layer on each clear key member is overlapped by a respective one of the openings in the fabric layer, each key member has an upper surface and a lower surface, the lower surface faces the fabric layer, the metal trim does not overlap the lower surface of the key member, and the metal trim does not overlap the upper surface of the key member.

\* \* \* \* \*